March 21, 1939.　　　G. T. JARRETT　　　2,151,515

CLUTCH PLATE

Filed Jan. 26, 1938　　　3 Sheets-Sheet 1

INVENTOR.
George T. Jarrett
BY Fay, Oberlin & Fay
ATTORNEYS.

March 21, 1939.  G. T. JARRETT  2,151,515
CLUTCH PLATE
Filed Jan. 26, 1938  3 Sheets-Sheet 2

INVENTOR.
George T. Jarrett
BY Fay, Oberlin & Fay
ATTORNEYS.

March 21, 1939.  G. T. JARRETT  2,151,515
CLUTCH PLATE
Filed Jan. 26, 1938  3 Sheets-Sheet 3

INVENTOR.
George T. Jarrett
BY Fay, Oberlin & Fay
ATTORNEYS

Patented Mar. 21, 1939

2,151,515

UNITED STATES PATENT OFFICE 2,151,515

CLUTCH PLATE

George T. Jarrett, East Cleveland, Ohio, assignor to Ira Saks

Application January 26, 1938, Serial No. 187,032

8 Claims. (Cl. 192—68)

The present invention relates to a novel construction for a clutch plate of the so-called "flexible center" type. In internal combustion engine clutches, various means have heretofore been evolved for the purpose of dampening vibrations likely to be transmitted through the clutch, and also for absorbing the sudden application of torque or load when the clutch parts are placed in engaging position.

One of the general types of these various means consists of the "flexible center" clutch plate wherein the hub and disc of the plate are made movable with respect to each other and resilient means such as rubber, spiral springs, leaf springs, torsional springs, coil springs and the like, have been mounted between the movable hub and disc for the purpose of dampening vibrations and absorbing torque.

The general object and nature of my invention is to provide such a "flexible center" clutch plate with a yieldable or spring element having a much greater life and durability, and therefore more resistance to fatigue failure than the corresponding elements heretofore contemplated in the prior art. The repeated application of stress and strain, viz., load and deformation, upon a flexible element usually tends to localize itself in a particular portion of that element and thereby, after a certain number of repetitions, fatigue failure or fracture will occur. In the construction embodying my invention, the stress and strain is distributed through the body of the flexible element so as to prevent such possibility of localization, and thereby greatly enhance the efficiency and operative life of the element.

To the accomplishment of the foregoing and related ends, said invention, then, consists of the means hereinafter fully described and particularly pointed out in the claims.

The annexed drawings and the following description set forth in detail certain structure embodying the invention, such disclosed means constituting, however, but one of various structural forms in which the principle of the invention may be used.

Figure 1:
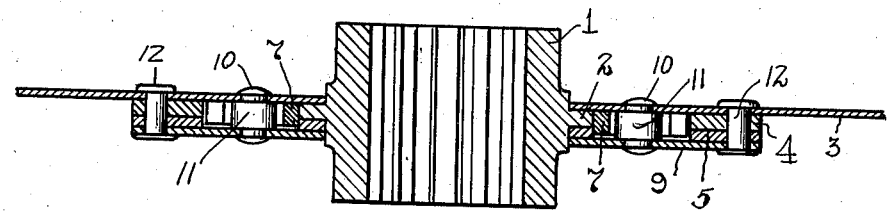
Figure 2:
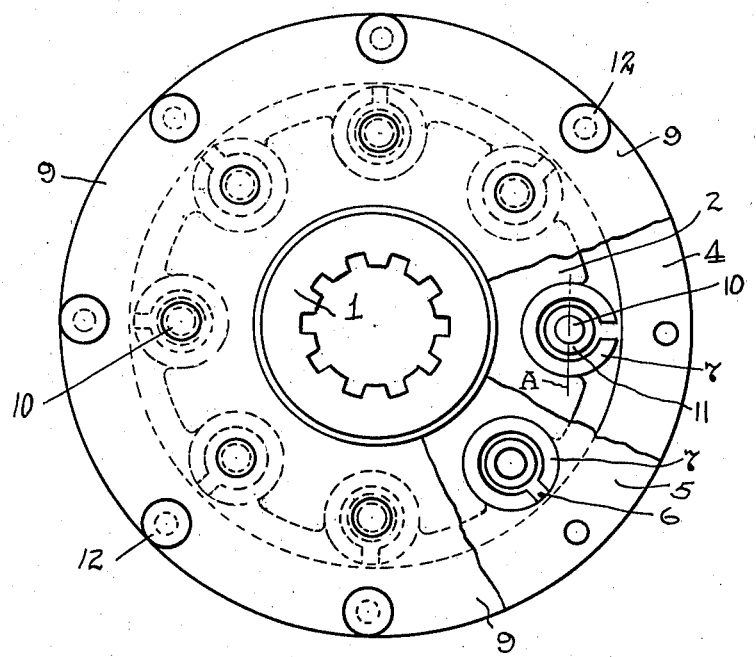
Figure 3:
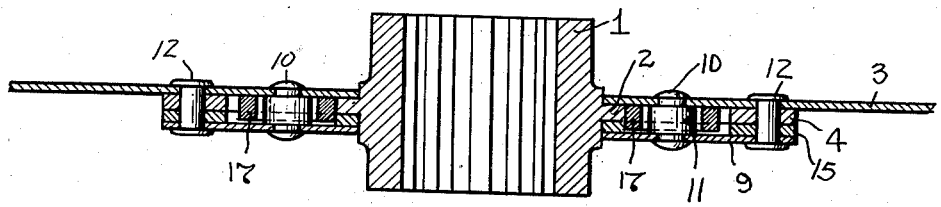
Figure 4:
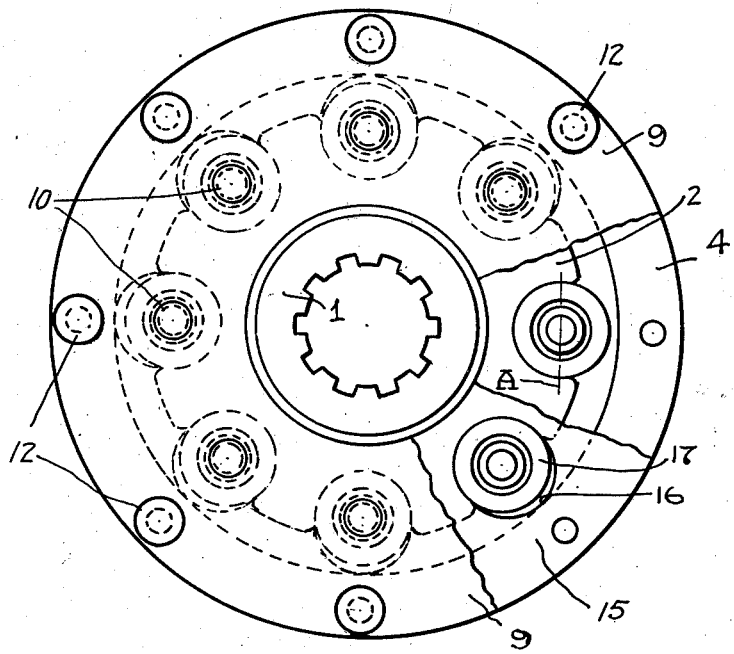
Figure 5:
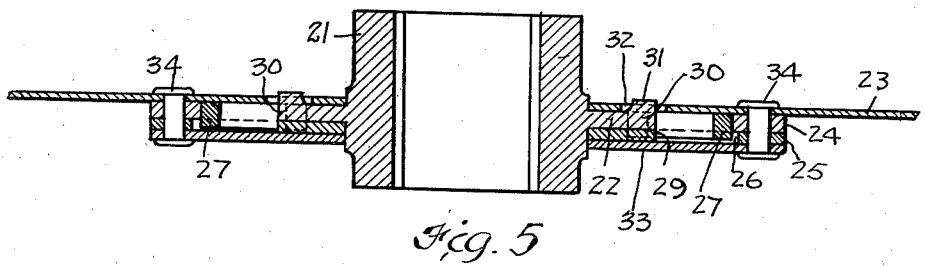
Figure 6:
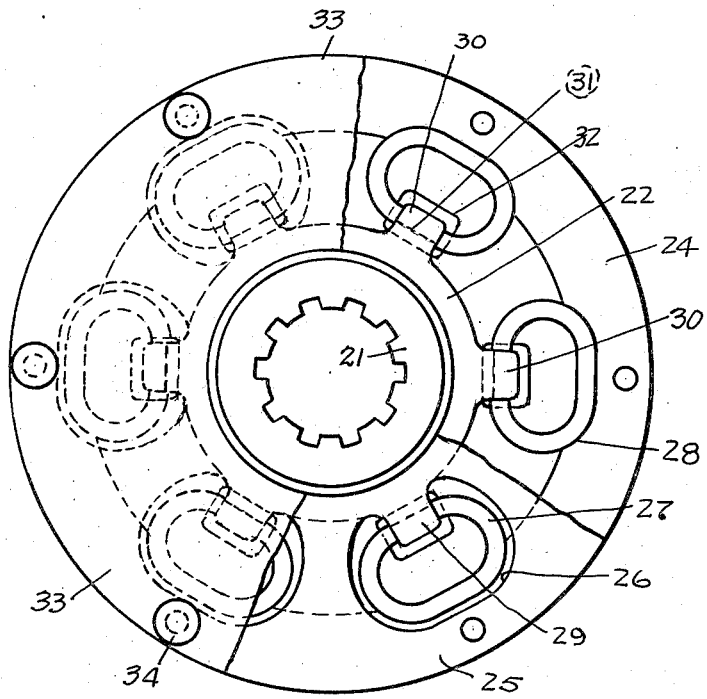

In said annexed drawings:

Fig. 1 is a sectional view of the central or hub portion of a clutch plate showing the construction embodying the principle of my invention; Fig. 2 is a plan view with portions broken away taken from the bottom side of Fig. 1; Fig. 3 is a sectional view similar to that of Fig. 1, but showing a modified form of construction; Fig. 4 is a plan view with portions broken away of the under side of Fig. 3; Fig. 5 is a sectional view showing another modified form of construction; and Fig. 6 is a plan view, with portions broken away, of the under side of Fig. 5.

Now referring more particularly to Figs. 1 and 2, there is shown therein a splined clutch plate hub 1, having the radially extending flange 2. A clutch plate disc 3 overlies the flange 2 and is movable with respect to the hub 1. A spacing ring 4 is mounted against the side of the disc 3. A side plate 5 contacts, at its inner portion, the hub flange 2, and at its outer portion, the spacer ring 4.

Circular openings 6 are provided in the side plate 5 for the reception of the resilient or yieldably deformable split rings 7. The openings 6 and the split rings 7 are arranged in a circular series about the center of the clutch plate.

The split rings 7 are also engaged by approximately semi-circular recesses in the hub flange 2. The walls of these recesses in the hub flange 2 subtend an arc slightly greater than semi-circular or 180° of angularity, so that a gripping or retaining action is had upon the split rings 7. The diametrical line A drawn through the center of the split ring 7 in Fig. 2 illustrates the manner in which the recesses in the hub flange 2 are of slightly more than semi-circular extent.

A cover plate 9 overlies the spacer ring 4, the side plate 5 and the split rings 7. Shouldered rivets 10 join the disc 3 and the cover plate 9 and have an enlarged intermediate portion 11 whose walls are spaced inwardly from the interior walls of the split rings 7. It should be obvious to those skilled in the art that the rivets 10 and their enlarged portions 11 could equally well be made in two parts, i. e., a rivet with a surrounding bushing taking the place of the enlarged portion 11. The rivets 10 with their enlarged portions 11 serve the additional function of limit stops for preventing movement between the disc 3 and hub 1 beyond the desired amount of flexibility. Rivets 12 also extend through the disc 3, spacer ring 4, side plate 5 and cover plate 9.

During operation of the above described construction of clutch plate, the torque or load transmitted therethrough from the disc 3 to the hub 1, or in an opposite direction, will be such as to tend initially to collapse the split rings 7, viz., to close the space between the ends adjacent the split. At or before the time when the ends opposite the split come in contact, the inside walls of the split rings 7 will abut against the enlarged rivet portion 11 (depending upon the direction of torque transmission) and thus prevent further flexible movement between the hub 1 and the disc 3.

Since the stresses are uniformly applied around the entire periphery of the split rings 7, the opportunity for the localization of any stress or strain, tending to produce fatigue failure, is substantially eliminated.

The spring action inherent in my above described construction is analogous to that which occurs during the contraction of a piston ring when a piston is inserted in its cylinder. Since such piston rings are ordinarily fabricated of cast iron whose yield point is extremely close to its tensile strength, extreme care must be exercised, such as by the use of a special tool capable of applying a uniform contracting force around the outer wall of the ring, lest undue localized force be applied and the piston ring thereby become fractured. The foregoing analogy is therefore also applicable to the principle of uniform distribution of stresses embodied in my invention.

In the modified form of construction shown in Figs. 3 and 4, the resilient or yieldably deformable element is made in the form of a closed ring or hollow cylinder. In this latter construction, the side plate 15 has an out-of-round or non-circular opening 16 for accommodating the deformation of the solid rings 17. The hub flange 2 is similarly constructed to that of the hub flange shown in the construction of Figs. 1 and 2 and as will be seen from Fig. 4, has recesses of greater than semi-circular extent for gripping and retaining the rings 17. When the closed rings 17 undergo yieldable deformation, they are forced from a circular to a non-circular or out-of-round contour so as to occupy the openings 16 in the side plate 15. A similar limit stop action will occur between the rings 17 and the enlarged rivet portions 11, as previously described in connection with the construction shown in Figs. 1 and 2.

The split ring yieldable element of Figs. 1 and 2 can also be used in the form of construction shown in Figs. 3 and 4. Such adaptation is not illustrated in the drawings, since it should be readily understood by those skilled in the art. Suffice it to say that a split ring having a smaller split, or the ends opposite the split closer together, can be substituted for the solid rings 17 in the side plate openings 16. In the last explained construction, initial deformation of the split rings will first bring the ends opposite the split into abutment and then force the rings into out-of-round conformation.

In the modified form of construction shown in Figs. 5 and 6, the yieldable ring elements are made in a C-shaped or split oval ring form. The hub 21 having the flange 22 is, of course, movably mounted with respect to the disc 23. The spacer ring 24 is mounted against the disc 23 and the side plate 25 is mounted against the spacer ring 24. The side plate 25 has C-shaped openings 26 whose walls are normally slightly spaced from the outer walls of the C-shaped or split oval rings 27. Projecting portions or tongues 29 extend inwardly from the openings 26 and engage with the ends of the split oval rings 27 opposite the split. Projections 30 on the hub flange 22 also contact with these ends. The closed side of the slit rings 27 is received in recesses 28 in the inner periphery of the spacer ring 24. The rings 27 are thus contacted by the dish portion of the clutch plate through the walls of the recesses 28 and through the tongues 29.

Lateral projections 31, forming a portion of the projections 30, extend through openings 32 in the disc 23. Contact of the lateral projections 31 with the ends of the openings 32 thus provide limit stops for the flexible movement between the hub 21 and disc 23.

A cover plate 33 overlies the side plate 25 and rings 27 and is secured to the disc 23 by means of the rivets 34.

In the last described modified form of construction, movement between the hub 21 and disc 23 will tend to expand or spread apart the ends of the split oval rings 27, or, in other words, "to open the C". The stress incident to such movement will of course be substantially in the nature of a bending stress, which will be also distributed around the periphery of the oval rings 27, at least in that portion of the periphery which is supported by and is in contact with the walls of the recesses 28. In fact, the flexible or yieldable deformation action upon the rings 27 is in a sense just the opposite to that of the rings 7 in that the rings 27 are expanded, rather than contracted, during flexible movement.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. In a clutch plate, the combination of a hub portion and a disc portion movable with respect to each other, and yieldable metallic elements adapted to absorb movement between said hub portion and said disc portion comprising a circularly arranged series of ring-shaped members mounted therebetween and adapted to be deformed out of their original ring-shape upon such movement, said disc portion including openings completely surrounding the outer periphery of said ring-shaped members.

2. In a clutch plate, the combination of a hub portion and a disc portion movable with respect to each other, and yieldable metallic elements adapted to absorb movement between said hub portion and said disc portion comprising a circularly arranged series of split rings mounted therebetween and adapted to be deformed out of their original ring-shape upon such movement, said disc portion including openings completely surrounding the outer periphery of said split rings.

3. In a clutch plate, the combination of a hub portion and a disc portion movable with respect to each other, and yieldable metallic elements adapted to absorbed movement between said hub portion and said disc portion comprising a circularly arranged series of hollow cylindrical members mounted therebetween and adapted to be deformed out of their original cylindrical form upon such movement, said disc portion including non-circular openings completely surrounding the outer periphery of said cylindrical members.

4. In a clutch plate, the combination of a hub and a disc movable with respect to each other, yieldably deformable ring-shaped members, and a side plate carried by said disc having openings adapted to enclose and contact with a portion of the outer wall of said ring-shaped members, and projections on said hub adapted to contact with another portion of the outer wall of said ring-shaped members.

5. In a clutch plate, the combination of a hub and a disc movable with respect to each other, yieldably deformable split rings, and a side plate carried by said disc having openings adapted to enclose and contact with a portion of the outer wall of said split rings, and projections on said hub adapted to contact with another portion of the outer wall of said split rings.

6. In a clutch plate, the combination of a hub and a disc movable with respect to each other, yieldably deformable hollow cylindrical members, and a side plate carried by said disc having openings adapted to enclose and contact with a portion of the outer wall of said hollow cylindrical members, and projections on said hub adapted to contact with another portion of the outer wall of said cylindrical members.

7. In a clutch plate, the combination of a hub and a disc movable with respect to each other, yieldably deformable split rings, and a side plate carried by said disc having openings adapted to enclose and contact with a portion of the outer wall of said split rings, and projections on said hub adapted to bear against the ends of said ring adjacent the split.

8. In a clutch plate, the combination of a hub and a disc movable with respect to each other, yieldably deformable ring-shaped members, and a side plate carried by said disc having openings adapted to enclose and contact with a portion of the outer wall of said ring-shaped members, projections on said hub adapted to contact with another portion of the outer wall of said ring-shaped members, and limit stop means carried by said disc and extending through the interior of said ring-shaped members for limiting the movement between said hub and said disc.

GEORGE T. JARRETT.